(12) United States Patent
Daoud

(10) Patent No.: US 6,274,812 B1
(45) Date of Patent: Aug. 14, 2001

(54) CABLE SEALING DEVICE SYSTEM

(75) Inventor: Bassel Hage Daoud, Parsippany, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/465,303

(22) Filed: Dec. 17, 1999

(51) Int. Cl.[7] .................................................. H02G 3/18
(52) U.S. Cl. ........................... 174/65 R; 174/65 SS; 174/135; 248/56; 16/2.2; 439/604
(58) Field of Search ........................... 174/65 G, 65 R, 174/65 SS, 64, 60, 135, 151, 152 G, 91, 93, 77 R; 248/56; 16/2.1, 2.2; 439/604, 587, 274

(56) References Cited

U.S. PATENT DOCUMENTS

| | | | |
|---|---|---|---|
| 3,613,050 | * 10/1971 | Andrews ........................... | 439/580 |
| 4,431,198 | * 2/1984 | Beinhaur et al. ................... | 174/65 R |
| 4,721,832 | * 1/1988 | Toy ........................................ | 174/87 |
| 5,234,185 | * 8/1993 | Hoffman et al. ...................... | 248/56 |
| 5,510,576 | * 4/1996 | Tenace et al. ..................... | 174/65 SS |
| 5,516,985 | * 5/1996 | Merkel et al. ...................... | 174/74 A |
| 5,696,351 | * 12/1997 | Benn et al. ............................. | 174/92 |
| 5,783,778 | * 7/1998 | Foss et al. ......................... | 174/77 R |
| 5,959,250 | * 9/1999 | Daoud ................................. | 174/65 R |

FOREIGN PATENT DOCUMENTS

1232834 * 5/1971 (GB) .................................. 174/65 R

* cited by examiner

Primary Examiner—Dean A. Reichard
Assistant Examiner—Dhiru R Patel
(74) Attorney, Agent, or Firm—Stroock & Stroock & Lavan LLP

(57) ABSTRACT

A cable sealing device that may be quickly installed and that provides both gripping of a cable and sealing of an opening in an enclosure end cap. The inventive cable sealing device further provides a quick, inexpensive, reliable, and includes gripping and sealing for cable ingress to and egress from an enclosure.

19 Claims, 3 Drawing Sheets

CABLE SEALING DEVICE SYSTEM

FIELD OF THE INVENTION

The present invention relates to cable sealing devices and, more particularly, to a cable sealing device that may be quickly and reliably installed and that includes a cable grip for sealingly gripping a cable held within the device.

BACKGROUND OF THE INVENTION

Cable enclosures are essential components in data- and telecommunications networks. Enclosures may be provided at various locations in a network, including at the ingress and egress to a building (either inside or outside the building) and at interconnection points within the network, e.g., on a telephone pole or in a utility box. Cables may be routed into and out of the enclosure through openings typically provided in an enclosure cover. In addition to cables, interconnection hardware, electronic devices, circuits, etc., may also be contained within an enclosure. Regardless of where an enclosure is located (i.e., inside or outside), it is desirable to seal the enclosure to prevent exposure of the interior compartment of the enclosure and its contents to undesirable and potentially damaging environmental conditions (e.g., moisture, caustic materials, particular matter, etc.).

A grommet or other sealing device is typically provided at an opening in the enclosure cover to provide a partial seal of that opening when a cable, for example, as routed through the opening. However, such sealing devices do not provide sufficient sealing to ensure the integrity of the interior environment against damaging environmental conditions. A shape-adaptive part such as, for example, heat-shrink tubing, may be placed around the cable at the ingress/egress point and around the grommet to further seal the enclosure opening. However, that solution is time-consuming and also may not necessarily guarantee a consistent and reliable seal.

There thus exists a need for a cable sealing device that overcomes the above-described shortcomings of the prior art.

SUMMARY OF THE INVENTION

The present invention is directed to a cable sealing device that quickly, consistently and reliably provides a seal of a cable ingress/egress opening.

The present invention is also directed to a cable sealing device for providing a seal at an opening in an enclosure. The sealing device comprising a generally cylindrical body having a first part and a second part, the body having a cable channel defined longitudinally through the body and through which a cable may be routed. A cable grip is defined in the cable channel that provides both gripping of a cable routed through the cable channel and sealing of the cable channel. The first part of the body is sized and shaped to pass through the opening in the enclosure. The second part of the body has an outer surface and is sized and shaped so that the outer surface at least partially contacts an inner part of the opening so as to secure the cable sealing device in the opening and so as to compress the cable grip about the cable to grip the cable and seal the cable channel.

The present invention is further directed to a sealing system for an enclosure comprising an enclosure end cap for sealing an opening in the enclosure. The end cap includes a cable port having an inner surface. The cable sealing system also includes a sealing device through which a cable may be routed and for providing a seal of the cable port. The sealing device comprises a generally cylindrical body having a first part and a second part, and having a cable channel defined longitudinally through the body. A cable grip is defined in the cable channel that provides both gripping of a cable routed through the cable channel and sealing of the cable channel. The first part of the body is preferably sized and shaped to pass through the cable port. The second part of the body has an outer surface and is sized and shaped so that the outer surface at least partially contacts an inner surface of the cable port opening so as to secure the cable sealing device in the cable port and so as to compress the cable grip about the cable to grip the cable and seal the cable channel.

The present invention is also directed to a cable sealing device for providing a seal at an opening in an enclosure. The sealing device comprises a generally cylindrical body having a cable channel defined therethrough and through which a cable may be routed and within which is defined a cable grip. The body at least partially contacts an inner part of the opening in the enclosure so as to secure the cable sealing device in the opening and thereby compressing the cable grip about the cable to grip the cable and seal the cable channel.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a cable sealing device 10 that may be quickly installed and that provides both gripping of a cable and sealing of an opening in an enclosure end cap. The inventive cable sealing device 10 further provides a quick, inexpensive, reliable, and consistent gripping and sealing for cable ingress to and egress from an enclosure.

Figure 1:
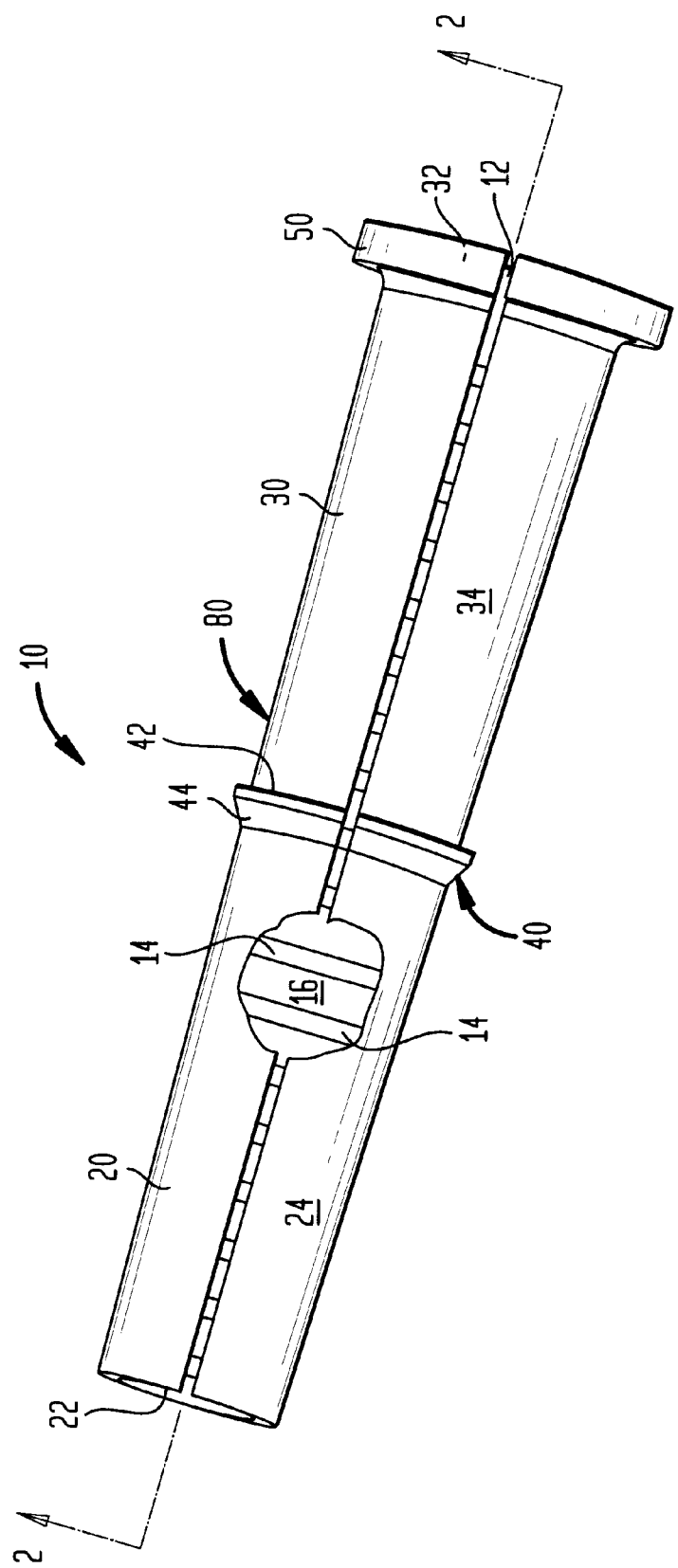
FIG 1 is perspective side-view of a cable sealing device constructed in accordance with the present invention.

Referring now to the drawings in detail, a cable sealing device 10 constructed in accordance with the present invention is depicted in FIG. 1. The device 10 consists of a generally cylindrical body 80 having openings 22, 32 defined at its longitudinal ends. The body 80 has a first part 20 and a second part 30 and is slightly tapered from the first part 20 to the second part 30. A first retainer 40 is provided circumferentially about the body 80 and approximately between the first part 20 and second part 30. The first retainer 40 has a ramped part 44 to facilitate passage of the device 10 through an opening (such as a cable port 62 in an enclosure end cap 60 (see, e.g., FIG. 3) and a retaining surface 42 to prevent passage of the device 10 out of the cable port 62 when the device 10 is secured in place (as described below). A second retainer 50 is provided at an end of the body 80 located near the second part 30 and extends substantially circumferentially about the body 80. The second retainer 50 interferes with an inner surface 70 (see, e.g., FIG. 3) of the enclosure end cap 60 to prevent the device 10 from being pulled completely through the cable port 62 in the end cap 60. The first retainer 40 and second retainer 50 cooperatively secure the device 10 in place in the end cap 60, with the first retainer 40 also providing additional sealing of the cable port 62.

Figure 2:
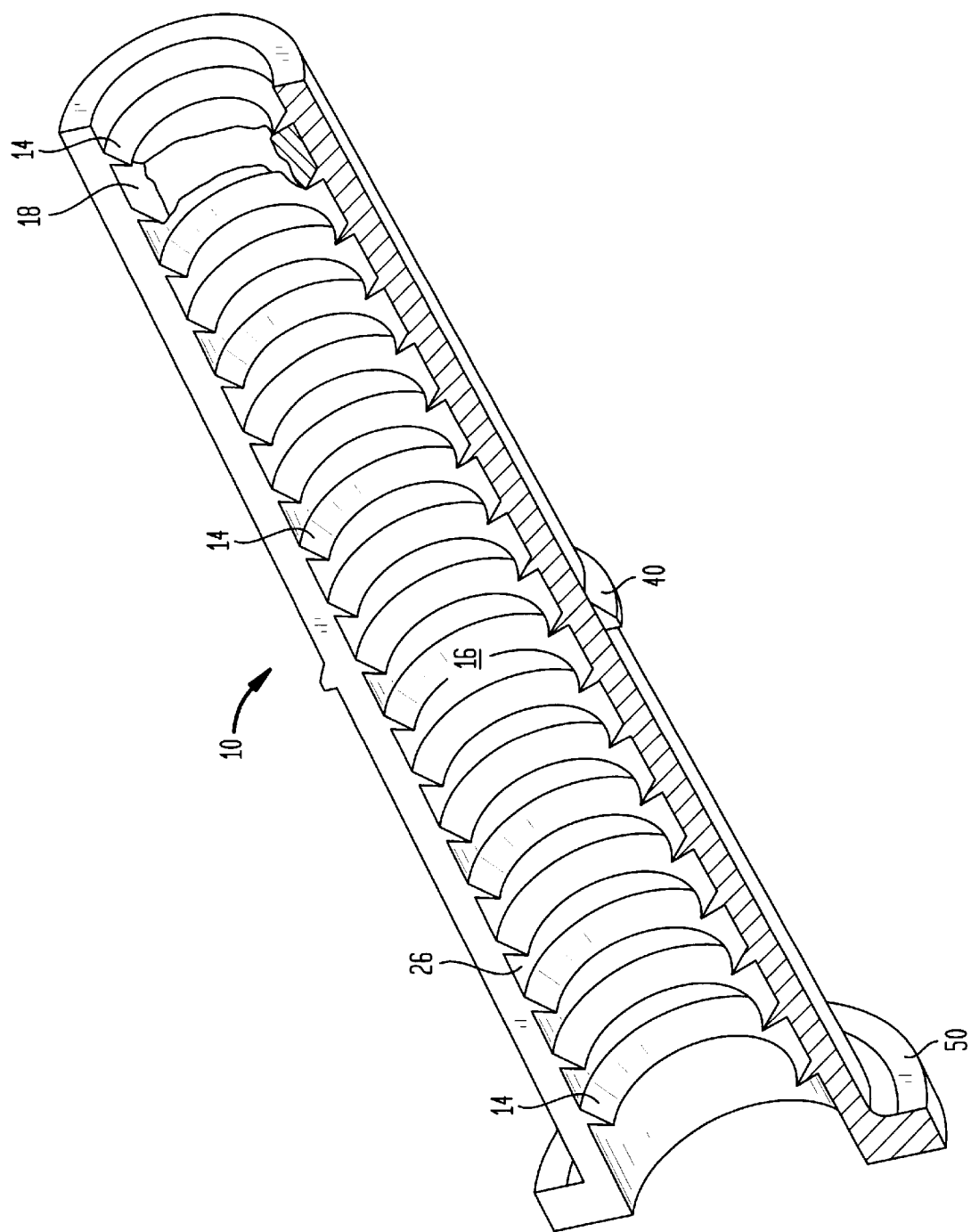
FIG 2 is a cross-sectional view of the cable sealing device of FIG. 1 taken along line 2—2.

Referring next to FIG. 2, a cross-sectional view of the cable sealing device 10 of the present invention is there depicted. A cable channel 16 is defined approximately longitudinally through the body 80 and through which a cable 100 (see, e.g., FIG. 3) may be guided. A plurality of ribs 14 are provided generally circumferentially about the cable channel 16. The ribs 14 are generally pliable and compressible and grip the cable 100 and provide sealing of the cable channel 16 (and thus the cable port 62) when the device 10 is secured in the cable port 62. A compressible medium 18, such as, for example, a silicon gel, may be provided in a gap 26 defined between adjacent ribs 14 to provide additional gripping of the cable 100 and additional sealing of the cable channel 16. The ribs 14 and compressible medium 18, if provided, are collectively referred to herein as a cable grip.

The body 80 may be constructed of a generally rigid material such as, for example, a rigid thermoplastic, or alternatively, of a generally resilient, yet durable material such as, for example, rubber. In either case, the ribs 14 are preferably constructed of a resilient and/or compressible material to provide the desired gripping and sealing features of the present invention.

A slit 12 (see, e.g., FIG. 1) may be provided in the body 80 and preferably extending the length of the body 80. For a generally pliable body 80, the slit 12 facilitates passage of a cable 100 into the cable channel 16 before the device 10 is secured in the cable port 62.

Operation of the inventive cable sealing device 10 will now be described with reference to FIG. 3. The cable sealing device 10 is preferably used in connection with a cap such as, for example, a removable enclosure end cap 60 that seals an opening in an enclosure 90. As used herein, the term enclosure 90 generally refers to any sealed or sealable container having an interior compartment 92 within which cables, electronics, connectors, and various other data- and telecommunication network devices, components, equipment, etc., may be provided. The enclosure 90 may be located in a generally controlled environment, such as an equipment closet in a building, or in a generally uncontrolled environment, such as outside of a building. The enclosure 90 may be exposed to various environmental conditions, including relatively benign and potentially damaging conditions and materials. For example, the enclosure 90 may be exposed to caustic materials, moisture (rain, under-water deployment, etc.), or particulate matter (dirt, dust, etc.). In any of the above-described environments, or any other environment within which the enclosure 90 is deployed, it is desirable to ensure the integrity of the interior compartment 92 so that the various devices, components, equipment, etc., contained therein are not damaged.

Figure 3:
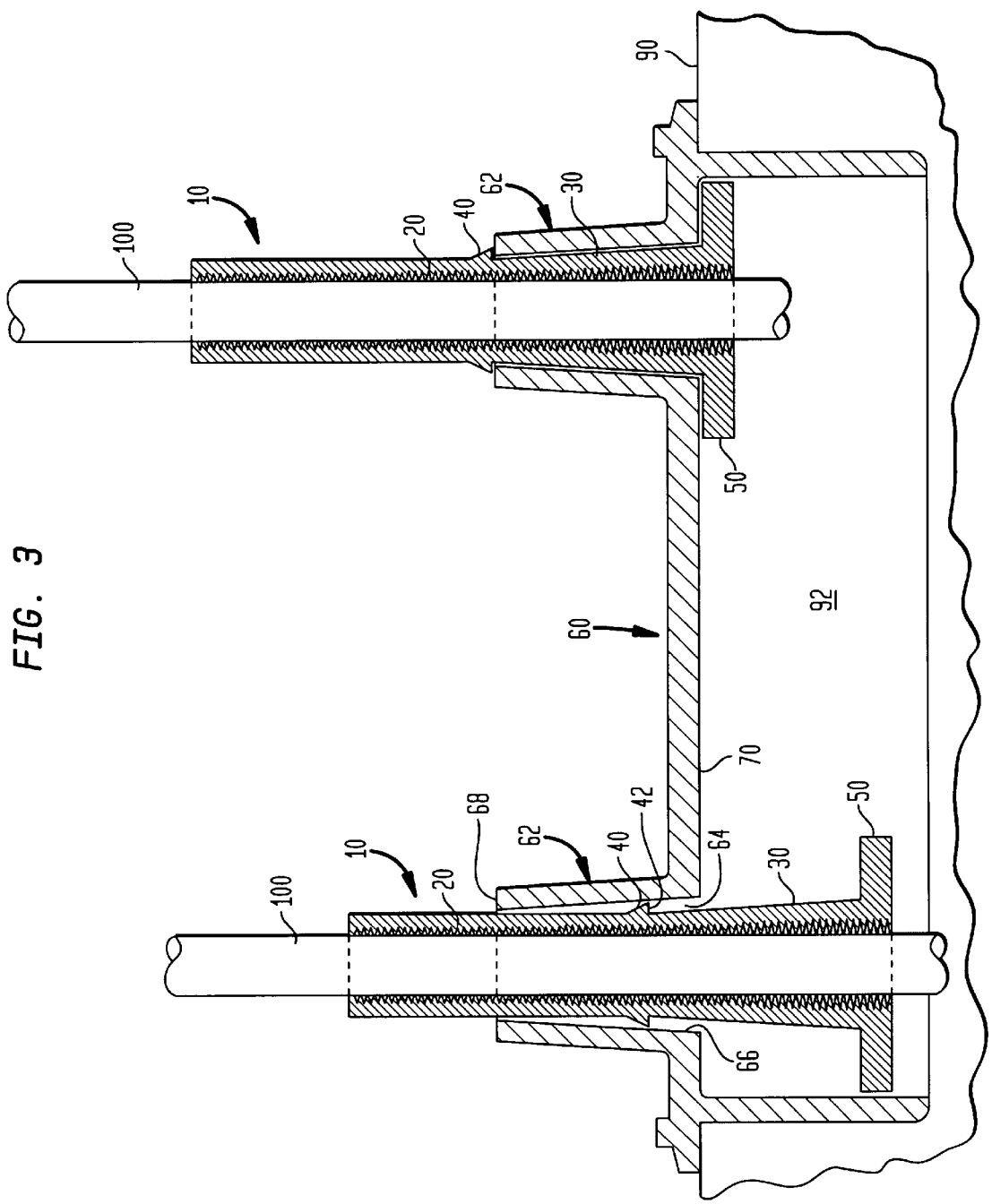
FIG 3 is a view of an enclosure having an enclosure end cap (depicted in cross-section) and having two cable sealing devices constructed in accordance with the present invention.

With continued reference to FIG. 3, a cable sealing device 10 in accordance with the present invention is depicted in two positions: partially installed in the cable port 62 (the left side of FIG. 3) and completely installed in the cable port 62 (the right side of FIG. 3). In use, a cable 100 is routed or placed in the cable channel 16 of the device 10. If the device 10 is equipped with a slit 12, the cable 100 may be passed through the slit 12 and into the cable channel 16. Otherwise, the cable 100 may be passed through the openings 22, 32 provided in the body 80 of the device 10. Once the cable 100 is in the cable channel 16, the ribs 14 and the compressible medium 18, if provided, contactingly surround the cable 100. In that position, the ribs 14 and compressible medium 18 may be partly compressed and may provide a seal (or partial seal) of the cable channel 16. The device 10 may then be threaded through a cable port channel 64 defined though a cable port 62 (i.e., opening) in the enclosure end cap 60. As the device 10 is pulled or guided through the cable port 62, the first part 20 of the body 80 may pass freely through the cable port channel 64, or an outer surface 24 of the first part 20 (see, e.g., FIG. 1) may at least partially contact an inner surface 66 of the cable port 62. As the first retainer 40 enters the cable port channel 64, the ramped surface 44 contacts the inner surface 66 of the cable port 62, thereby compressing the ribs 14 (and compressible medium 18) about the cable 100. As the ribs 14 are compressed, they contact and grip the cable 100 and form a seal thereabout. Compression of the ribs 14 and compressible medium 18 continues as the device 10 is pulled or guided through the cable port channel 64, effected by continuing contact between the ramped surface 44 and inner surface 66, and by at least partial contact between an outer surface 34 of the second part 30 and the inner surface 66 of the cable port 62. The device 10 may be so pulled or guided until the second retainer 50, at least partially contacts an inner surface 70 of the enclosure end cap 60, thereby arresting further movement of the device 10 through the cable port channel 64 and into the cable port 62. When the cable sealing device 10 is secured in the cable port 62, as depicted in the right side of FIG. 3, the ramped surface 44 is located outside of the cable port channel 64 and the retainer surface 42 is located in at least partially contacting relation with a top surface 68 of the cable port 62. That relationship prevents movement of the device 10 out of the position depicted in the right side of FIG. 3. The size and shape of the cable port channel 64 and of the second part 30 of the body 80 (e.g., its outer dimensions, amount of taper, etc.) provide a generally constant and continuous compression of the ribs 14 and compressible medium 18 to grip the cable 100 and seal the cable port 62 and cable channel 16. The compressible medium 18 is caused to completely surround the cable 100 and also to fill the slit 12 to thus provide a complete seal of the cable channel 16. A seal of the cable port 62 and/or cable channel 16 occurs when the interior compartment 92 of the enclosure 90 is substantially protected against exposure to undesirable environmental conditions.

Thus, the cable sealing device 10 of the present invention quickly, simply, reliably, and consistently grips a cable 100 and seals an enclosure opening against intrusion into the enclosure 90 of undesirable and potentially damaging elements.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A cable sealing device for providing a seal at an opening in an enclosure, said sealing device comprising a generally cylindrical body having a first part and a second part, said body having a cable channel defined longitudinally therethrough and through which a cable may be routed and within which is defined a cable grip, said first part of said body being sized and shaped to pass through the opening and said second part of said body having an outer surface and being sized and shaped so that said outer surface at least partially contacts an inner part of the opening so as to secure said cable sealing device in the opening and so as compress said cable grip about the cable to grip the cable and seal said cable channel.

2. A cable sealing device as recited by claim 1, wherein said cable grip comprises a plurality of ribs extending substantially circumferentially about said cable channel.

3. A cable sealing device as recited by claim 2, wherein said body includes a longitudinally defined slit through which the cable may be passed into said cable channel.

4. A cable sealing device as recited by claim 1, wherein said cable grip comprises:
   a plurality of ribs extending substantially circumferentially about said cable channel, a gap being defined between adjacent ones of said plurality of ribs; and
   a compressible medium disposed in said gap defined between adjacent ones of said plurality of ribs, said compressible medium surroundingly sealing the cable within said cable channel when said cable sealing device is secured within the opening.

5. A cable sealing device as recited by claim 4, wherein said body includes a longitudinally defined slit through which the cable may be passed into said cable channel.

6. A cable sealing device as recited by claim 4, further comprising a first retainer between said first part and said second part of said body and extending substantially circumferentially thereabout, said first retainer at least partially contacting a part of an end cap of the enclosure thereby securing said cable sealing device within the opening.

7. A cable sealing device as recited by claim 6, further comprising a second retainer located at an end of said body near said second part of said body and extending substantially circumferentially thereabout, said second retainer at least partially contacting another part of the enclosure end cap to prevent said cable sealing device from passing through the opening in the enclosure end cap.

8. A cable sealing device as recited by claim 2, further comprising a first retainer between said first part and said second part of said body and extending substantially circumferentially thereabout, said first retainer at least partially contacting a part of an end cap of the enclosure thereby securing said cable sealing device within the opening.

9. A cable sealing device as recited by claim 8, further comprising a second retainer located at an end of said body near said second part of said body and extending substantially circumferentially thereabout, said second retainer at least partially contacting another part of the enclosure end cap to prevent said cable sealing device from passing through the opening in the enclosure end cap.

10. A sealing system for an enclosure comprising:
   an enclosure end cap for sealing an opening in the enclosure, said end cap including a cable port having an inner surface; and
   a sealing device through which a cable may be routed and for providing a seal of said cable port, said sealing device comprising:
      a generally cylindrical body having a first part and a second part, said body having a cable channel defined longitudinally therethrough and through which a cable may be routed and within which is defined a cable grip, said first part of said body being sized and shaped to pass through said cable port and said second part of said body having an outer surface and being sized and shaped so that said outer surface at least partially contacts said inner surface of said cable port so as to secure said sealing device in said cable port and so as to compress said cable grip about the cable to grip the cable and seal said cable channel.

11. A cable sealing system as recited by claim 10, wherein said cable grip comprises a plurality of ribs extending substantially circumferentially about said cable channel.

12. A cable sealing system as recited by claim 11, wherein said body includes a longitudinally defined slit through which the cable may be passed into said cable channel.

13. A cable sealing system as recited by claim 11, further comprising a first retainer between said first part and said second part of said body and extending.

14. A cable sealing system as recited by claim 13, further comprising a second retainer located at an end of said body near said second part of said body and extending substantially circumferentially thereabout, said second retainer at least partially contacting another part of said enclosure end cap to prevent said cable sealing device from passing through said cable port.

15. A cable sealing system as recited by claim 10, wherein said cable grip comprises:
   a plurality of ribs extending substantially circumferentially about said cable channel, a gap being defined between adjacent ones of said plurality of ribs; and
   a compressible medium disposed in said gap defined between adjacent ones of said plurality of ribs, said compressible medium surroundingly sealing the cable within said cable channel when said cable sealing device is secured within said cable port.

16. A cable sealing system as recited by claim 15, wherein said body includes a longitudinally defined slit through which the cable may be passed into said cable channel.

17. A cable sealing system as recited by claim 15, further comprising a first retainer between said first part and said second part of said body and extending substantially circumferentially thereabout, said first retainer at least partially contacting a part of said enclosure end cap thereby securing said cable sealing device within said cable port.

18. A cable sealing system as recited by claim 17, further comprising a second retainer located at an end of said body near said second part of said body and extending substantially circumferentially thereabout, said second retainer at least partially contacting another part of said enclosure end cap to prevent said cable sealing device from passing through said cable port.

19. A cable sealing device for providing a seal at an opening in an enclosure, said sealing device comprising a generally cylindrical body having a cable channel defined therethrough and through which a cable may be routed and within which is defined a cable grip, said body at least partially contacting an inner part of the opening in the enclosure so as to secure said cable sealing device in the opening and so as to compress said cable grip about the cable to grip the cable and seal said cable channel, wherein said cable grip comprises a plurality of ribs extending substantially circumferentially about said cable channel, a gap being defined between adjacent ones of said plurality of ribs, and a compressible medium disposed in said gap defined between adjacent ones of said plurality of ribs, said compressible medium surroundingly sealing the cable within said cable channel when said sealing device is secured within the opening.

* * * * *